Nov. 8, 1966
F. KESSELRING
3,284,732
HIGH-SPEED RECLOSING CIRCUIT BREAKER HAVING
RELEASABLE COUPLING MEANS FOR CONNECTION
WITH ROTATING MASS
Filed May 21, 1964
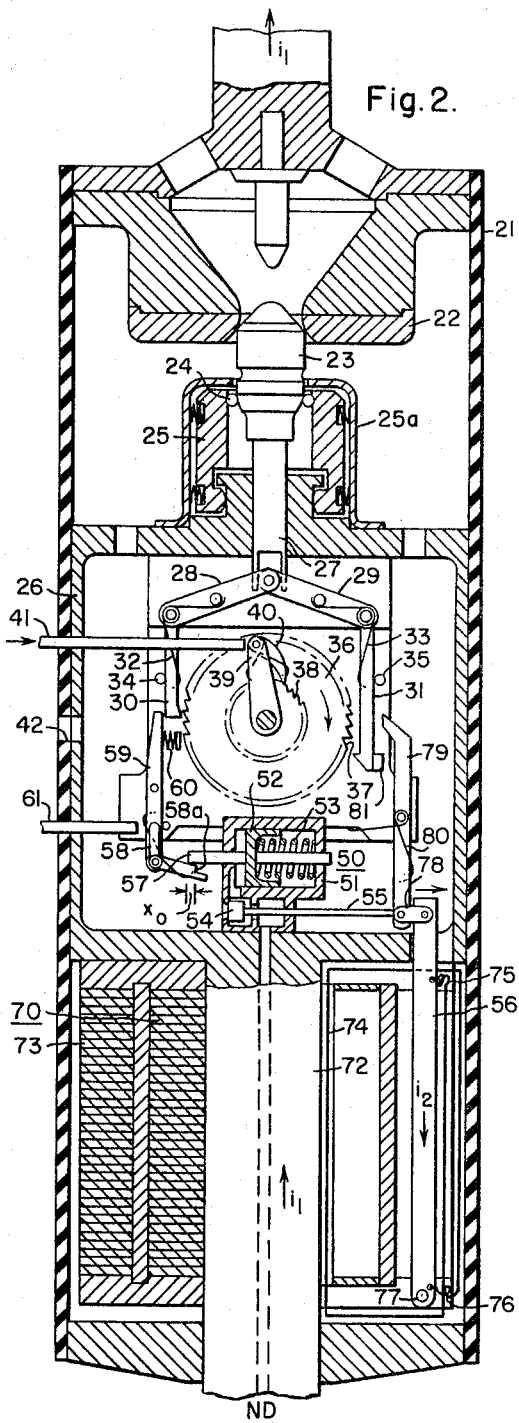
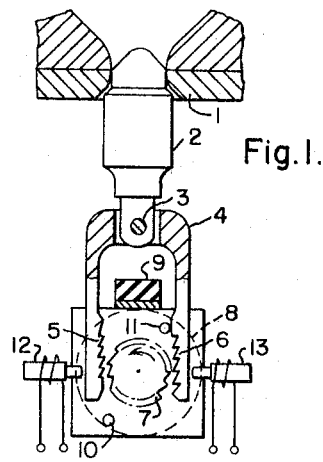
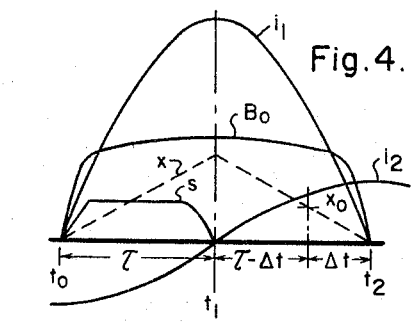
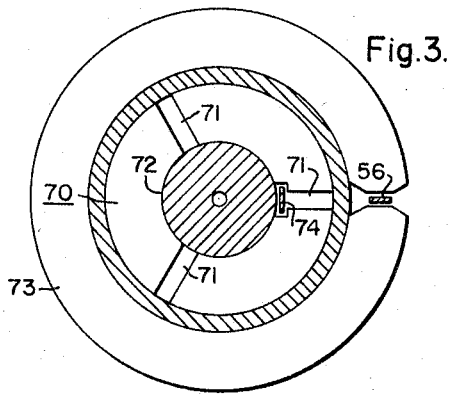
INVENTOR
Fritz Kesselring
BY
Clement L. McHale
ATTORNEY 3,284,732
Patented Nov. 8, 1966

3,284,732
HIGH-SPEED RECLOSING CIRCUIT BREAKER HAVING RELEASABLE COUPLING MEANS FOR CONNECTION WITH ROTATING MASS
Fritz Kesselring, Kusnacht, Zurich, Switzerland, assignor to Siemens-Schuckertwerke Aktiengesellschaft, Erlangen, Germany, a corporation of Germany
Filed May 21, 1964, Ser. No. 369,208
Claims priority, application Germany, May 29, 1963, S 85,449
11 Claims. (Cl. 335—24)

This invention relates, generally, to electric circuit breakers and, more particularly, to a fast opening and fast reclosing synchronized circuit breaker.

In the contemporary switching techniques, it is necessary, during switching for short or momentary interruption, to reclose immediately after opening. If the short circuit persists, this process is repeated once or twice more, whereby the time interval between the opening and reclosing is mostly between 0.2 to 0.3 second. In case of synchronized breakers, it appeared to be necessary, for example in case of a flash-over fault, to reclose immediately after opening, whereby the time interval should amount to only one to two milliseconds. The circuit breakers for short (momentary) interrupting are operated so far by spring stored energy mechanisms, whereby the energy for opening and closing is stored in several springs. There are also available compressed air and motor operated mechanisms. However, the expenditure is always very high. So far, the synchronized breakers have been reclosed by compressed gas mechanisms or by electro-dynamic mechanisms. In the first case, valves must be actuated which results in considerable time delay; in the second case, although it is possible to obtain very rapid reclosing, nevertheless, the cost of capacitors and circuit elements is of great importance.

An object of this invention, generally stated, is to provide a circuit breaker capable of quickly repeating closing and opening operations.

A more specific object of the invention is to provide for deriving the energy for operating a circuit breaker from a rotating mass which, at least upon an opening command or signal, is set into rotation and, after acquiring a rotational energy sufficient for several, closely successive operations, is connected with the movable contact by means of coupling members which are operative in both directions.

Other objects of the invention will be explained fully hereinafter or will be apparent to those skilled in the art.

In accordance with one embodiment of the invention, the energy for operating a fast opening and fast reclosing circuit breaker is derived from a rotating mass which is connected with the movable contact member by means of couplings, for example toothed racks, operated in one direction for closing and in the opposite direction for opening.

For a better understanding of the nature and objects of the invention, reference may be had to the following detailed description, taken in conjunction with the accompanying drawing in which:

FIGURE 1 is a view, partly in section and partly in elevation, showing the operating mechanism, particularly for operation at short circuit interruptions, and the contact members of a circuit breaker;

FIGS. 2 and 3 are views, primarily in section, showing a synchronized breaker with fast reclosing; and FIG. 4 is a graphical view utilized in explaining the operation of the synchronizing control.

Referring to the drawing, and particularly to FIG. 1, the portion of the circuit breaker shown therein comprises a stationary nozzle-like contact 1 and a movable contact member 2 which is pivotally connected by means of a pin 3 to a fork 4. The fork 4 has two downwardly extending legs, one of which has a toothed rack 5 on its inner side, and the other one of which also has a toothed rack 6 on its inner side. The racks 5 and 6 are disposed on opposite sides of a pinion or ratchet wheel 7 which is connected, for example, by means of a friction coupling (not shown) with a rotating mass 8. The mass 8 can be connected, for example by an insulating shaft, with a motor (not shown) which is at ground potential and which is started simultaneously with a signal which initiates opening of the contact members of the circuit breaker. A control magnet or solenoid 12 comprising an opening means is disposed on the side of the toothed rack 5 opposite the ratchet wheel 7 and a solenoid 13 comprising a closing means is disposed on the side of the toothed rack 6 or coupling means opposite the ratchet wheel 7.

In order to open the contact members of the circuit breaker, the winding of the solenoid 12 is energized, thereby causing the core of the solenoid 12 to engage the toothed rack 5 or coupling means causing it to move counterclockwise about the pivot point 3 of the fork 4, whereby the teeth on the rack 5 engage the teeth on the ratchet wheel 7 which is driven by the rotating mass 8 in a direction shown by the arrow. Consequently, the movable contact member 2 is moved downwardly by the fork 4 until the opening movement of the contact member is stopped by the stop member 9. The engagement of the toothed rack 5 with the toothed wheel 7 is maintained by the magnet 12 until the lower beveled end of the toothed rack 5 engages a pin or releasing means 10 shortly before the final opening position of the movable contact member 2 is reached. In this way, the engagement of the toothed rack 5 with the wheel 7 is released. At this moment the opening operation is completed and the core of the magnet 12 is returned to the position shown in the drawing by the fork striking the pin 10.

If it is desired to close the breaker again after completing the opening, the control magnet or solenoid 13 constituting a closing means is energized, which moves the fork 4 or toothed rack means in a clockwise direction about its pivot point 3, whereby the toothed rack 6 engages the toothed wheel 7 which moves the fork 4 upwardly to reclose the breaker. The release of the rack 6 from the wheel 7 takes place in a manner corresponding to the release of the rack 5. A beveled projection on the rack 6 engages a pin 11 constituting a releasing means to disengage the rack 6 from the wheel 7 and return the core of the magnet 13 to the position shown in the drawing. The movable contact member 2 is held in the nozzle contact 1 by friction. It will be understood that the energization of the control magnets 12 and 13 of the opening and closing means may be controlled by suitable control means in a manner well shown in the art.

In the circuit breaker shown in FIG. 2, 21 indicates an insulating cylinder which essentially forms the interrupting chamber. The numeral 22 designates a stationary nozzle-like contact. The reference numeral 23 designates a movable contact member which is directly connected with a metal cylinder 26 through a plurality of segmental contact rollers 24 and contact bridging fingers 25. A cup-like member 25a, which is attached to the cylinder 26, retains the contact bridges 25 in position. An operating rod 27 is connected mechanically with levers 28 and 29, to the ends of which are linked ratchet levers 30 and 31, which are pressed by springs 32 and 33 against pins 34 and 35, respectively. A rotating mass 36 is provided at its circumference with a toothed rim 37. The mass 36 is rotated in the direction of the arrow by movement of an insulating rod 41 through a ratchet drive mechanism 38, 39, 40. The insulating rod 41 can be driven, for example, by a compressed gas mechanism (not shown) arranged at ground potential. The inside space of the breaker chamber 21 is connected with a compressed gas storage tank (not shown) through an opening 42. The toothed rim 37 and the pivotally mounted rack levers 30, 31 collectively constitute a toothed coupling means to operate the movable contact 23 at high speed in both the opening and closing directions.

A synchronizing device 50 includes a cylinder 51, a piston 52, a spring 53, and a two-way valve 54 which is coupled with a movable conductor 56 by means of a rod 55. At the return stroke of the piston 52, a piston rod 57 becomes positively connected with a curved lever 58 in a manner explained hereinafter, whereby a lever 59 constituting a part of the opening means rotates in a clockwise direction about its pivot point against a spring 60. A release rod 61 may be operated by hand or from an overcurrent protective device.

The movable conductor 56 (see also FIG. 3) is connected in the secondary circuit of an air gap current transformer 70 with air gaps 71. The transformer 70 is energized by current $i_1$ flowing through a terminal bolt 72. The reference character 73 designates a magnet system, which is also energized by the current $i_1$ and in the air gap of which moves the conductor 56. A secondary winding 74 of the current transformer 70 is connected, by means of flexible conductors 75 and 76, with the conductor 56 which is movable about its pivotal support 77. The upper end of the conductor 56 is connected with a lever 79, constituting a part of the closing means, by means of a link 78. The conductor 56 and the lever 79 are kept in the position shown by a spring 80.

The synchronized breaker shown in FIGS. 2 and 3 functions as follows: When the current $i_1$ is increasing (see FIG. 4), the current transformer 70 produces in the conductor 56 a current $i_2$ which is shifted by approximately 90° with reference to $i_1$ and which produces together with induction or field strength $B_0$ in the air gap of the magnet system 73 a force F according to the formula $$F = lB_0 i_2$$

where $l$ is the effective length of the conductor 56. From $t_0$ to $t_1$ (see FIG. 4) this force is negative and moves the conductor 56 (FIGS. 2 and 3) instantaneously to the right against the stop formed by the wall of the cylinder 26 through the bottom of which the conductor 56 extends. In FIG. 4 this movement of the conductor 56 is shown by the line $s$. At the time $t_1$, the force F reaches the zero value; but already before this, the conductor 56 has moved back again into the position shown under the effect of the spring 80 and remains there during the time $t_1$ to $t_2$, because then it is pushed against the stop by the force F.

By means of the rod 55 (see FIG. 2) the movement of the conductor 56 opens the valve 54 on the side of the space which is under high pressure. The compressed gas enters behind the piston 52 which then moves to the right against the spring 53 in proportion to the increasing pressure. When the maximum of the current is reached, the valve 54 is closed on the high pressure space by the conductor 56 and it is opened on the low pressure side (ND). This results in movement of the piston 52 under the force of the spring 53 to the left. The travel of the piston rod 57, solidly connected with piston 52, is shown in FIG. 4 by $x$. When the distance $x_0$ is exceeded, the curved lever 58 turns in the counterclockwise direction and, therefore, becomes positively connected at the stop 58a with the piston rod 57 on the return travel of the latter. The lever 59 is rotated clockwise by the lever 58 and thus engages the lever 30 with the toothed rim 37 of the rotating mass 36. The movable contact 23 is brought into the open position at a great speed by the kinetic energy of the mass 36 through the lever 28.

It can be seen from FIG. 4 that the longer the time (half-wave time), the greater is the distance $x$, through which the piston 52 moves. If the travel $x_0$, which corresponds to the lowest value of $\tau$ at which a release just still takes place, is not reached, then the lever 58 remains in the position shown. As can be seen from FIG. 4, at longer half-waves the release takes place always at the same interval $\Delta t$ from the current zero.

However, the described opening procedure can take place only when the release rod 61 is in the "release position" shown. If it is moved to the right until it is in contact with the perpendicular part of the curved lever 58, then also in the case of an overcurrent, releasing is not possible because the curved lever 58 cannot then rotate. Otherwise, the synchronized operation always takes place in orderly manner by the release rod 61 when the release is unblocked. The release is independent of the time instant when the release rod 61 is moved to the left.

In the case of a multipole breaker there occurs a possibility that due to some circumstances the extinguishing does not take place in the intended current zero or that the so-called re-strike occurs. Then the breaker must be brought instantly into the closed position, whereby a provision must be made to the effect that the synchronized opening can take place again at the next current zero. With the arrangement shown in FIG. 2 this happens in the following manner: When the current $i_1$ again increases, the conductor 56 moves, as previously explained, to the right and thus the lever 79 is rotated in a counterclockwise direction. In the open position of the contact member 23, a lug 81 on the lever 31 is located opposite the upper end of the lever 79 so that when the latter is rotated, the lever or closing means 31 engages with the toothed rim 37 and the breaker is brought again into the closed position in which it is held by the contact rollers 24, which push against the conical surface of the contact member 23. The groove located above the conical surface serves for latching the breaker in the open position.

It can be seen that by means of the rotating mass 36 it is possible to close or open a high capacity circuit breaker within a time of several milliseconds with only small control forces produced by the synchronizing control system 50 and the conductor 56. In order to keep the impact on the teeth of the toothed rim 37 within permissible limits, there is arranged between the moving masses, represented by the movable contact 23, a flexible member, for example by utilizing levers 28 and 29 which have a certain elastic flexibility. Instead of the toothed wheel 38 with the pawl 40, a friction clutch with a flat or conical seat can be utilized for driving the rotating mass 36. The mass 36 could also be motor driven in the manner described with reference to FIG. 1.

From the foregoing description it is apparent that the invention provides for fast opening and fast closing of the circuit breaker by utilizing the kinetic energy of a rotating mass to operate the contact member of the breaker. The invention may be utilized with either a synchronized or a non-synchronized breaker.

Since numerous changes may be made in the above-described construction and different embodiments of the invention may be made without departing from the spirit and scope thereof, it is intended that all subject matter contained in the foregoing description or shown in the accompanying drawing shall be interpreted as illustrative and not in a limiting sense.

I claim as my invention:

1. A fast-opening and fast-reclosing type of circuit breaker comprising a movable contact member, a cooperable stationary contact member cooperable therewith to establish an arc, a rotating mass rotating in one direction only, coupling means comprising opening means and closing means for connecting the rotating mass to the movable contact member to operate the contact member in opposite directions for high-speed opening and reclosing duty, and releasing means for said coupling means operable at the end of travel in said opposite directions.

2. A fast-opening and fast-reclosing type of circuit breaker comprising a movable contact member, a cooperable stationary contact member cooperable therewith to establish an arc, a rotating mass rotating in one direction only, toothed coupling means comprising opening means and closing means operable in opposite directions for connecting the rotating mass to the movable contact member to operate the movable contact member in opposite directions for high-speed opening and reclosing duty, and releasing means for said coupling means operable at the end of travel in said opening and closing directions.

3. A fast-opening and fast-reclosing type of circuit breaker comprising a movable contact member, a cooperable stationary contact member cooperable therewith to establish an arc, a rotating mass rotating in one direction only, toothed means connected to the movable contact member, opening means and closing means for engaging the toothed means with the rotating mass to operate the contact member at high speed in both the opening and closing directions, and means for releasing the toothed means from the mass at the end of the opening and closing directions.

4. A fast-opening and fast-reclosing type of circuit breaker comprising a movable contact member, a cooperable stationary contact member cooperable therewith to establish an arc, a rotating mass rotating in one direction only, toothed means connected to the movable contact member, electrically controlled opening means and closing means for engaging the toothed means with the rotating mass to operate the movable contact member in both the opening and closing directions at high speed, and mechanical means for releasing the toothed means from the rotating mass at the end of the opening and closing directions.

5. A fast-opening and fast-reclosing type of circuit breaker comprising a movable contact member, a cooperable stationary contact member cooperable therewith to establish an arc, a rotating mass rotating in one direction only, gear means driven by the rotating mass, toothed rack means connected to the movable contact member, opening means and closing means for operating the toothed rack means in opposite directions to engage the rotating gear means to operate the movable contact member for high-speed opening and reclosing service, and releasing means for said toothed rack means operable at the end of the high-speed opening and closing operations of the movable contact member.

6. A fast opening and fast reclosing circuit breaker comprising a movable contact member, a rotating mass, gear means driven by the mass, toothed rack means disposed on opposite sides of the gear means and pivotally connected to the movable contact member, means for operating the rack means in one direction to engage the rotating mass to open the contact member and in the opposite direction to engage the rotating mass to close the contact member, and releasing means for said toothed rack means operable at the end of the opening and closing operations of the movable contact member.

7. In an alternating current synchronized circuit breaker, in combination, a contact member movable to interrupt a current conducting circuit, a rotating mass, coupling members for connecting the mass to the contact member to operate the contact member, control means for operating the coupling members, a magnetic circuit energized by the current flowing through the circuit to be interrupted and having an air gap therein, and a movable conductor arranged in the air gap to control the operation of the control means.

8. In an alternating current synchronized circuit breaker, in combination, a contact member movable to interrupt a current conducting circuit, a rotating mass, coupling members for connecting the mass to the contact member to operate the contact member, control means for operating the coupling members, a magnetic circuit energized by the current flowing through the circuit to be interrupted and having an air gap therein, a current transformer energized by the current in the circuit to be interrupted, a conductor arranged in said air gap and movable to control the operation of said control means, and said conductor being connected in the secondary circuit of said current transformer.

9. In an alternating current synchronized circuit breaker, in combination, a contact member movable to interrupt a current conducting circuit, a rotating mass, coupling members for connecting the mass to the contact member to operate the contact member, control means for operating the coupling members, a magnetic circuit energized by the current flowing through the circuit to be interrupted and having an air gap therein, a current transformer energized by the current in the circuit to be interrupted, a conductor pivotally arranged in said air gap and connected in the secondary circuit of said current transformer, and valve means operated by the conductor to conrtol the operation of the control means.

10. In an alternating current synchronized circuit breaker, in combination, a contact member movable to interrupt a current conducting circuit, a rotating mass, coupling members for connecting the mass to the contact member to operate the contact member, control means for operating the coupling members, a magnetic circuit energized by the current flowing through the circuit to be interrupted and having an air gap therein, a current transformer energized by the current in the circuit to be interrupted, a conductor pivotally arranged in said air gap and connected in the secondary circuit of said current transformer, valve means operated by the conductor to control the operation of the control means, and adjustable release means for releasing the coupling members from the control means.

11. In an alternating current synchronized circuit breaker, in combination, a contact member movable to interrupt a current conducting circuit, a rotating mass, coupling members operable in one direction to cause the mass to open the contact member and in the opposite direction to cause the mass to close the contact member, fluid pressure means for operating the coupling members, valves means for controlling the operation of the fluid pressure means, a magnetic circuit energized by the current in the circuit to be interrupted and having an air gap therein, a current transformer also energized by the current to be interrupted, and a conductor pivotally arranged in said air gap and connected in the secondary circuit of the current transformer to operate said valve means to cause opening of the contact member when the current to be interrupted passes through substantially zero.

References Cited by the Examiner

UNITED STATES PATENTS

| | | | |
|---|---|---|---|
| 1,729,538 | 9/1929 | Coates et al. | 200—92 |
| 2,821,861 | 2/1958 | Dunn | 74—30 |
| 3,029,327 | 4/1962 | Volker | 200—92 |

BERNARD A. GILHEANY, *Primary Examiner.*

ROBERT K. SCHAEFER, *Examiner.*

R. N. ENVALL, JR., *Assistant Examiner.*